US011022755B2

United States Patent
Chen et al.

(10) Patent No.: US 11,022,755 B2
(45) Date of Patent: Jun. 1, 2021

(54) DEMOUNTABLE EDGE COUPLERS WITH MICRO-MIRROR OPTICAL BENCH FOR PHOTONIC INTEGRATED CIRCUITS

(71) Applicant: NANOPRECISION PRODUCTS, INC., Camarillo, CA (US)

(72) Inventors: Yang Chen, Thousand Oaks, CA (US); Robert Ryan Vallance, Newbury Park, CA (US)

(73) Assignee: CUDOQUANTA FLORIDA, INC., Sarasota, FL (US)

( * ) Notice: Subject to any disclaimer, the term of this patent is extended or adjusted under 35 U.S.C. 154(b) by 0 days.

(21) Appl. No.: 16/662,016

(22) Filed: Oct. 23, 2019

(65) Prior Publication Data

US 2020/0124798 A1 Apr. 23, 2020

Related U.S. Application Data

(60) Provisional application No. 62/749,616, filed on Oct. 23, 2018, provisional application No. 62/749,618, filed on Oct. 23, 2018.

(51) Int. Cl.
*G02B 6/26* (2006.01)
*G02B 6/38* (2006.01)

(52) U.S. Cl.
CPC ............. *G02B 6/26* (2013.01); *G02B 6/3839* (2013.01); *G02B 6/3882* (2013.01); *G02B 6/3897* (2013.01)

(58) Field of Classification Search
CPC .......... G02B 6/26; G02B 6/3839; G02B 6/32; G02B 6/3882; G02B 6/3897; G02B 6/422;
(Continued)

(56) References Cited

U.S. PATENT DOCUMENTS 6,243,508 B1 * 6/2001 Jewell .................. G02B 6/4206
385/14
6,736,553 B1 * 5/2004 Stiehl ................... G02B 6/4246
385/89
(Continued)

FOREIGN PATENT DOCUMENTS

CN 107346053 11/2017
DE 102009047800 3/2011
(Continued)

OTHER PUBLICATIONS

International Search Report of Counterpart PCT International Application No. PCT/US2019/057742.

*Primary Examiner* — Jennifer Doan
(74) *Attorney, Agent, or Firm* — Liu & Liu

(57) ABSTRACT

An edge coupler having an optical bench with a mirror array. Each mirror bends, reflects and/or reshapes incident light. The edge coupler is optically coupled to the optical elements in a PIC chip which direct light to the edge of the PIC chip. The edge coupler provides a demountable, passively aligned coupling between an optical fiber array and the PIC chip. The edge coupler may be a free space edge coupler without any optical element between the mirror array and the optical elements of the PIC chip, or may include grooves each receiving a section of optical fiber with its longitudinal axis along the first light path and terminating substantially at or extending beyond the edge of the edge coupler. The optical fiber array may include an optical fiber connector terminating and supporting the ends of the optical fibers in optical alignment with the mirror array of the edge coupler.

20 Claims, 11 Drawing Sheets

(58) Field of Classification Search
CPC .. G02B 6/4292; G02B 6/4214; G02B 6/3652; G02B 6/3885
See application file for complete search history.

(56) References Cited

U.S. PATENT DOCUMENTS

| | | |
|---|---|---|
| 8,774,580 B2 | 7/2014 | Bolle |
| 9,568,679 B2 | 2/2017 | Doany et al. |
| 9,791,641 B2 | 10/2017 | Heck et al. |
| 9,897,769 B2 | 2/2018 | Li et al. |
| 10,026,723 B2 | 7/2018 | Evans et al. |
| 2006/0251357 A1 | 11/2006 | Dietrich et al. |
| 2012/0057822 A1 | 3/2012 | Wu et al. |
| 2014/0177995 A1 | 6/2014 | Mohammed et al. |
| 2016/0202420 A1 | 7/2016 | Paquet |
| 2017/0003453 A1 | 1/2017 | Doany et al. |

FOREIGN PATENT DOCUMENTS

| | | |
|---|---|---|
| KR | 20060014475 | 2/2006 |
| WO | 2000073831 | 12/2000 |
| WO | 2011039110 | 4/2011 |

* cited by examiner

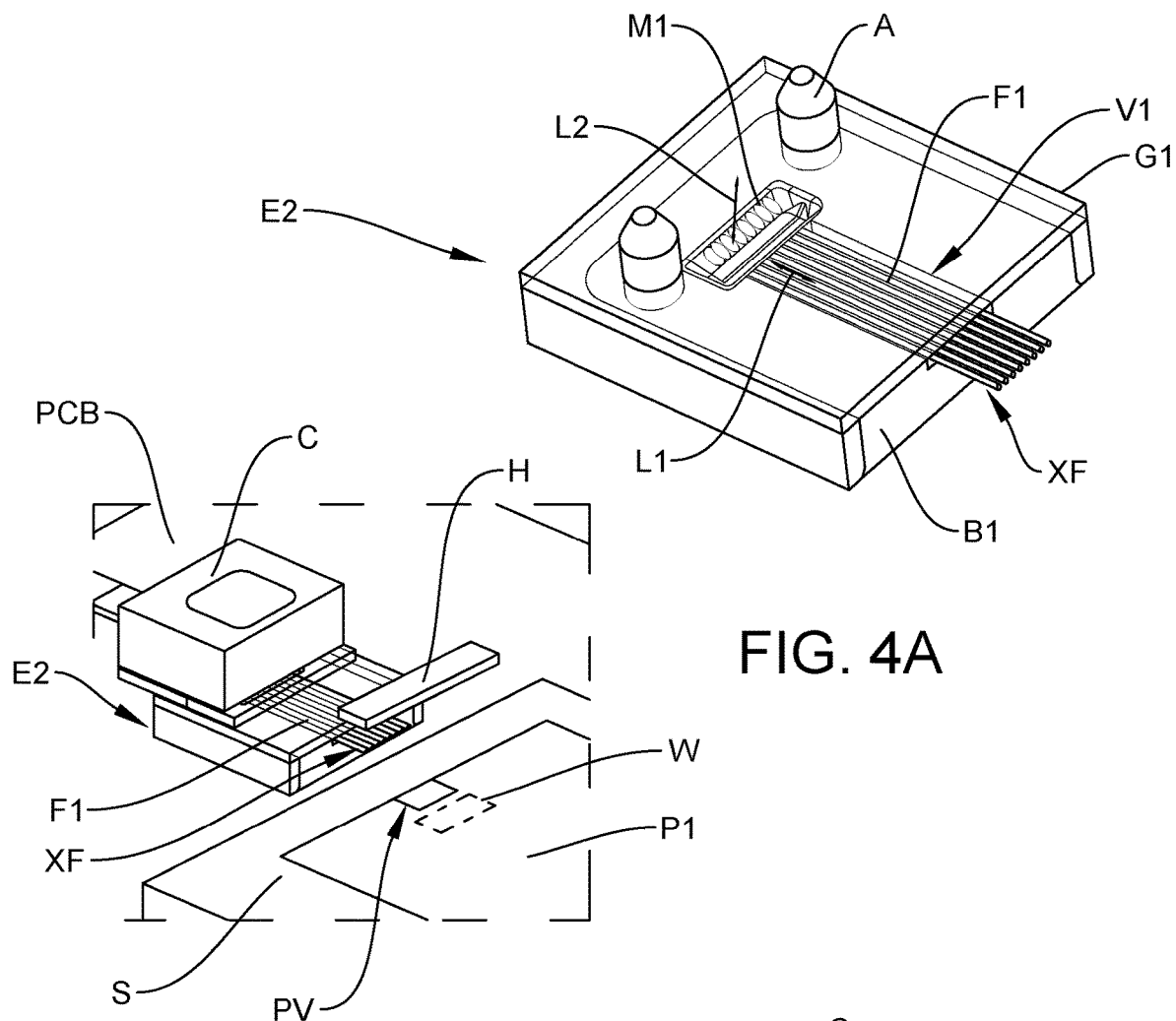
FIG. 4A
FIG. 4B
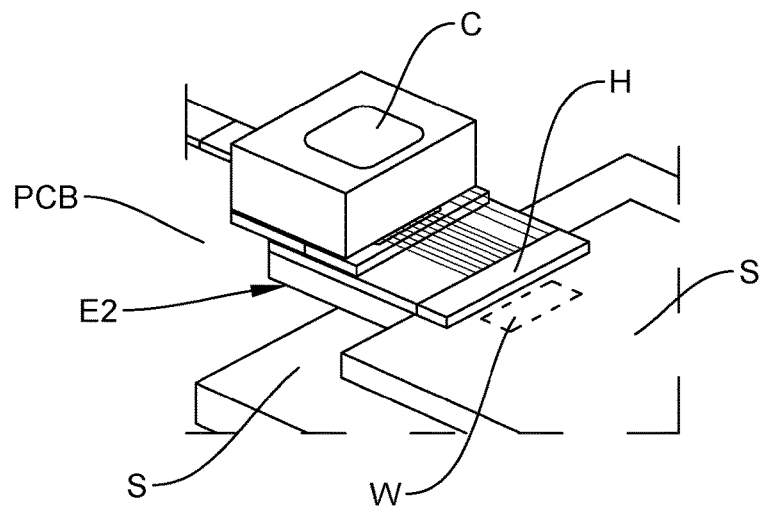
FIG. 4C

DEMOUNTABLE EDGE COUPLERS WITH MICRO-MIRROR OPTICAL BENCH FOR PHOTONIC INTEGRATED CIRCUITS

PRIORITY CLAIM

This application claims the priorities of (a) U.S. Provisional Patent Application No. 62/749,616 filed on Oct. 23, 2018; and (b) U.S. Provisional Patent Application No. 62/749,618 filed on Oct. 23, 2018. These applications are fully incorporated by reference as if fully set forth herein. All publications noted below are fully incorporated by reference as if fully set forth herein.

BACKGROUND OF THE INVENTION

Field of the Invention

The present invention relates to coupling of light into and out of photonic integrated circuits (PICs), and more particularly to the optical connection of optical fibers to PIC devices.

Description of Related Art

Photonic integrated circuits (PICs) or integrated optical circuits are part of an emerging technology that uses light as a basis of operation as opposed to an electric current. A PIC device integrates multiple (at least two) photonic functions and as such is analogous to an electronic integrated circuit. The major difference between the two is that a photonic integrated circuit provides functionality for information signals imposed on optical wavelengths typically in the visible spectrum or near infrared 850 nm-1650 nm.

PICs are used for various applications in telecommunications, instrumentation, and signal-processing fields. A PIC device (in the form of a photonic chip package) typically uses optical waveguides to implement and/or interconnect various on-chip elements, such as waveguides, optical switches, couplers, routers, splitters, multiplexers/demultiplexers, modulators, amplifiers, wavelength converters, optical-to-electrical (O/E) and electrical-to-optical (E/O) signal converters (e.g., photodiodes, lasers), etc. A waveguide in a PIC device is usually an on-chip solid light conductor that guides light due to an index-of-refraction contrast between the waveguide's core and cladding.

It is often necessary for PIC devices to have optical connections to other PIC devices, often in the form an organized network of optical signal communication. The connection distances may range from a several millimeters in the case of chip-to-chip communications up to many kilometers in case of long-reach applications. Optical fibers can provide an effective connection method since the light can flow within the optical fibers at very high data rates (>25 Gbps) over long distances due to low-loss optical fibers. For proper operation, a PIC device needs to efficiently couple light between an external optical fiber and one or more on-chip waveguides. An advantage of using light as a basis of circuit operation in a PIC device is that its energy cost for high-speed signal transmission is substantially less than that of electronic chips. Thus, efficient coupling between PIC devices and other optical devices, such as optical fibers, that maintains this advantage is an important aspect of PICs.

Most PIC devices require single-mode optical connections that require stringent alignment tolerances between optical fibers and the PIC, typically less than 1 micrometer. Efficient optical coupling to and from the on-chip single-mode waveguides to an external optical fiber is challenging due to the mismatch in size between the single-mode waveguides and the light-guiding cores within optical fibers. For example, the dimension of a typical silica optical fiber is approximately forty times larger than a typical waveguide on a PIC. Because of this size mismatch, if the single mode waveguide and the optical fiber are directly coupled, the respective modes of the waveguide and optical fiber may not couple efficiently resulting in an unacceptable insertion loss (e.g., >20 dB).

The current state-of-the-art attempts to achieve stringent alignment tolerances using polymer connector components, but polymers have several fundamental disadvantages. First, they are elastically compliant so that they deform easily under external applied loads. Second, they are not dimensionally stable and can change size and shape especially when subjected to elevated temperatures such as those found in computing and networking hardware. Third, the coefficient of thermal expansion (CTE) of polymers is much larger than the CTE of materials that are commonly used in PIC devices. Therefore, temperature cycles cause misalignment between the optical fibers and the optical elements on the PIC devices. In some cases, the polymers cannot withstand the processing temperatures used while soldering PIC devices onto printed circuit boards.

One approach to coupling optical fibers to a PIC device (or a PIC chip package) is to attach an optical fiber array to the edge of the PIC chip. Heretofore, an optical fiber array is aligned to the optical elements on the PIC chip using an active alignment approach in which the position and orientation of the optical fiber array is adjusted by machinery until the amount of light transferred between the optical fibers and the PIC is maximized. Once the connection is made, it is permanent, and would not be demountable, separable or detachable without destroying the integrity of connection and any hope of remounting the optical fibers to the PIC chip. In other words, optical fiber is not removably attachable to the PIC device, and the fiber connection, and separation would be destructive and not reversible (i.e., not reconnectable).

What is needed is a mechanism to bring the mode sizes of the optical fibers in a fiber array and on-chip optical elements close to each other to effectuate efficient coupling, and an improved approach to optically couple input/output of optical fibers to PIC devices, which improves tolerance, manufacturability, ease of use, functionality and reliability at reduced costs.

SUMMARY OF THE INVENTION

The present invention overcomes the drawbacks of the prior art by providing a demountable/separable and reconnectable edge coupler between an optical fiber array and a photonic integrated circuit (PIC) device (e.g., a PIC chip package). The edge coupler is attached at the edge of the PIC, in optical alignment with interfacing optical elements (e.g., waveguides) in the PIC. The inventive edge coupler includes a micro-mirror optical bench (MOB) having a mirror array, and a base that is configured and structured to be allow for demountable reconnection of the fiber array in optical alignment therewith.

In one aspect, the present invention provides an edge coupler comprising a micro-mirror optical bench, which comprises a bench or base (e.g., made of silicon, glass, or a malleable metal such as Kovar, Invar, aluminum, stainless steel), a first array of mirrors defined on the base, wherein each mirror includes a structured reflective surface profile that turns light between a first light path along a first (horizontal) direction in a plane substantially parallel to the top surface and a second light path along a second (vertical) direction outside the plane, and a passive alignment structure on the base for demountable coupling to an optical fiber connector of an external optical fiber array. Each mirror bends, reflects and/or reshapes an incident light. The edge coupler attached at the edge of the PIC chip to provide a demountable coupling between the optical fiber array and the PIC chip. More specifically, the demountable coupling is a separable and reconnectable connection between an optical fiber connector of the optical fiber array and the edge coupler, with the edge coupler configured and structured to allow the optical fiber connector to be removed and attached for reconnection to the edge coupler in optical alignment therewith.

In one embodiment, a photonic apparatus comprises a support (e.g., an interposer or an integrated circuit (IC) such as a CMOS chip); a PIC chip attached to a top surface of the support, wherein the PIC chip comprises optical elements (e.g., waveguides) routing light to an edge of the PIC chip to provide an optical interface to external of the PIC chip, wherein the edge coupler is supported on the support in alignment with respect to the PIC chip with the first array of mirrors in optical alignment with the optical elements of the PIC chip, and wherein the first light path of the edge coupler is between a mirror in the first array of mirrors and a corresponding optical element in the PIC chip.

In one embodiment, each mirror is an exposed free surface of the base (i.e., surface exposed to air, or not internal within the body of the base of the optical bench) having an exposed reflective free side facing a corresponding optical element of the PIC chip, and wherein the exposed reflective free side comprises the structured reflective surface profile at which light is directed to and from the corresponding optical element in the PIC chip. The structured reflective surface profile may comprise one of the following geometrical profiles: (a) ellipsoidal, (b) off-axis parabolic, or (c) other free-form shape. The mirrors may be defined on the base by stamping a malleable metal material.

In one embodiment, the edge coupler is a free space edge coupler without any optical element (e.g., optical fiber) between the first array of mirrors and the optical elements at the edge of the PIC chip. In another embodiment, the edge coupler base includes an array of grooves each receiving a section of optical fiber with its longitudinal axis along the first light path, with one of its end in optical alignment with a corresponding mirror along the first light path and the opposite end in optical alignment with a corresponding optical element in the PIC chip, wherein the grooves in the base terminates at an edge of base of the edge coupler facing the edge of the PIC chip. In one embodiment, the section of optical fiber terminates substantially at the edge of the base of the edge coupler, or slightly protruding from or receding from the edge of the base of the edge coupler. In another embodiment, the section of optical fiber includes an extended section extending beyond the edge of base of the edge coupler, wherein the extended section is received in a groove at the edge of the PIC chip with the extended end of the extended section in optical alignment with a corresponding optical element in the PIC chip.

In a further embodiment, each groove further receives a gradient index (GRIN) lens in optical alignment with the second end of the section of optical fiber received in the respective grooves along the first light path, wherein the GRIN lens converges light from a corresponding optical element in the PIC chip to the second end of the section of optical fiber or diverges light from the second end of the section of optical fiber to the corresponding optical element in the PIC chip.

In the embodiment of the edge coupler with grooves, the grooves and the first array of mirrors may be integrally defined on the base by stamping a unitary, monolithic block (e.g., a stock metal material or metal blank) of malleable metal material, to integrally and simultaneously form the reflective surfaces and optical fiber alignment grooves.

The optical fiber array comprises an optical fiber connector terminating and supporting the ends of the optical fibers in optical alignment with the first array of mirrors of the edge coupler, wherein the optical fiber connector inputs/outputs light in the second direction along the second light path, wherein with the optical fiber connector coupled to the edge coupler, light between the optical fiber array and the optical elements of the PIC chip follows a light path defined by the first light path and the second light path via the first array of mirrors in the edge coupler. The structured reflective surface profile of the mirrors is configured to reshape light from the PIC chip to match the mode field of the optical fibers in the optical fiber connector.

In one embodiment, the optical fiber connector comprises a structure to support the optical fibers to input/output light in the second direction along the second (vertical) light path, wherein with the optical fiber connector coupled to the edge coupler, light between the optical fiber array and the optical elements of the PIC chip follows a light path defined by the first light path and the second light path via the first array of mirrors in the edge coupler. The optical fiber connector may be in the form of an optical fiber ferrule connector, which holds the optical fibers therein in a vertical, perpendicular direction to the top surface of the PIC chip. In another embodiment, the optical fiber connector may comprises an optical bench comprising a second array of mirrors, wherein each mirror in the second array of mirrors includes a structured reflective surface profile that turns light between a third light path along a third (horizontal) direction parallel to the first (horizontal) direction and the second light path along the second (vertical) direction, to thereby input/output light in the second (vertical) direction along the second light path. In this embodiment, with the optical fiber connector coupled to the edge coupler, light between the optical fiber array and the optical elements of the PIC chip follows a light path defined by the first light path, the second light path and the third light path via the first array of mirrors in the edge coupler and the second array of mirrors in the optical fiber connector.

The optical fiber connector comprises a passive alignment structure complementary to the passive alignment structure on the edge coupler, and wherein the optical fiber connector is demountably coupled to the edge coupler by passive alignment based on the complementary passive alignment structures on the optical fiber connector and the edge coupler, to optically couple the optical fiber array with the optical elements of the PIC chip via the edge coupler. In one embodiment, the passive alignment structure on the edge coupler may comprise at least one of alignment pins, alignment pin holes and surface features to provide a kinematic coupling, a quasi-kinematic coupling or an elastic averaging coupling. The complementary passive alignment structure on the optical fiber connector comprises at least one of alignment pin holes, alignment pins, and surface features to provide a kinematic coupling, a quasi-kinematic coupling or an elastic averaging coupling, complementary to the corresponding passive alignment structure of the edge coupler.

The support of the PIC chip may be an interposer or an integrated circuit, which may be supported on a printed circuit board (PCB). The first array of mirrors may be disposed in optical alignment with the optical elements of the PIC chip by active alignment based on light between the edge coupler and the optical elements of the PIC chip, or by passive alignment of the edge coupler to the edge of the PIC chip based on fiducials provided on the glass cover and a top surface near the edge of the PIC chip, with the edge coupler passively aligned to the PIC chip by optically aligning the fiducials.

BRIEF DESCRIPTION OF THE DRAWINGS

For a fuller understanding of the nature and advantages of the invention, as well as the preferred mode of use, reference should be made to the following detailed description read in conjunction with the accompanying drawings. In the following drawings, like reference letters and/or numerals designate like or similar parts throughout the drawings.

FIG. 4A illustrates an edge coupler in accordance with a further embodiment of the present invention; FIGS. 4B and 4C are schematic views of attachment of the edge coupler to a PIC in accordance with a further embodiment of the present invention.

DETAILED DESCRIPTION OF THE PREFERRED EMBODIMENTS

This invention is described below in reference to various embodiments with reference to the figures. While this invention is described in terms of the best mode for achieving this invention's objectives, it will be appreciated by those skilled in the art that variations may be accomplished in view of these teachings without deviating from the spirit or scope of the invention.

The present invention overcomes the drawbacks of the prior art by providing a demountable/separable and reconnectable edge coupler between an optical fiber array and a photonic integrated circuit (PIC) device (e.g., a PIC chip package). The edge coupler is attached to an edge of the PIC chip, in optical alignment with interfacing optical elements (e.g., waveguides) in the PIC chip. The inventive edge coupler includes a micro-mirror optical bench (MOB) having a mirror array, and a base that is configured and structured to be allow for demountable reconnection of the fiber array in optical alignment therewith.

FIG. 1A to 1D illustrate an edge coupler, its coupling to a PIC chip, and the demountable coupling to an optical fiber array in accordance with one embodiment of the present invention.

Referring to FIGS. 1A to 1D, an edge coupler E comprises a micro-mirror optical bench (MOB), which comprises a bench or base B (e.g., made of silicon, glass, a malleable metal such as Kovar, Invar, aluminum, stainless steel) with a first array of mirrors M defined on the base. A transparent glass, quartz, or sapphire plate G covers the exposed surfaces on the bench B. In one embodiment, the edge coupler E may be filled with index-matching epoxy between the mirror surfaces M and the glass plate G. Each mirror M includes a structured reflective surface profile that turns light (e.g., by 90 degrees) between a first light path L1 along a first (horizontal) direction in a plane substantially parallel to the top surface and a second light path L2 along a second (vertical) direction outside the plane, and a passive alignment structure A on the base B for demountable coupling to an optical fiber connector of an external optical fiber array FA (will be explained in greater detail in connection with FIGS. 2A, 2B).

Figure 1A:
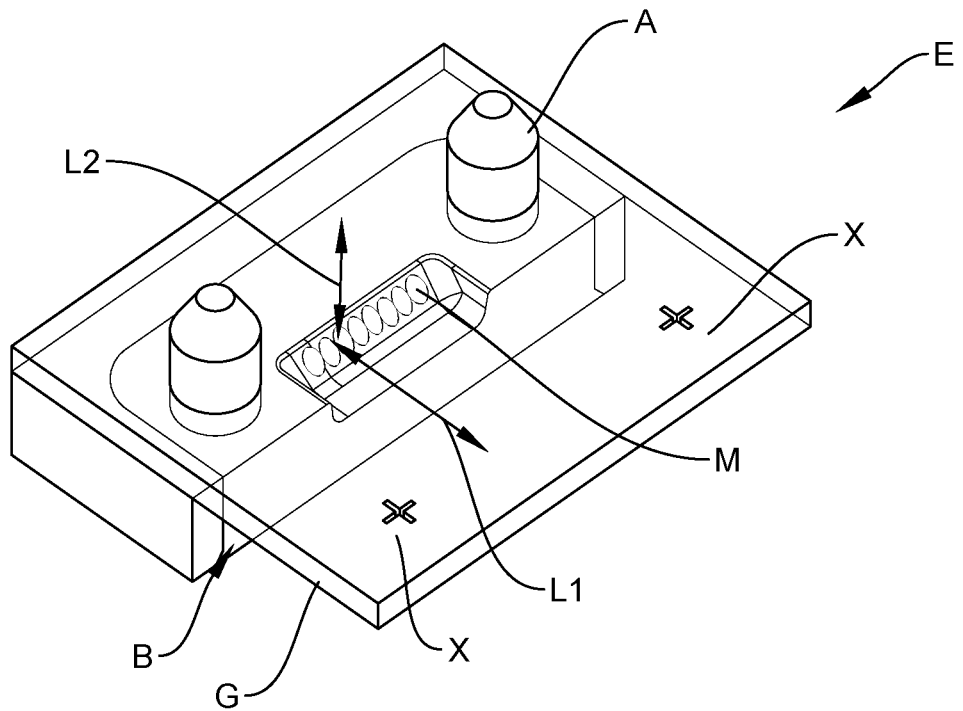
FIG. 1A illustrates an edge coupler in accordance with one embodiment of the present invention.
Figure 1B:
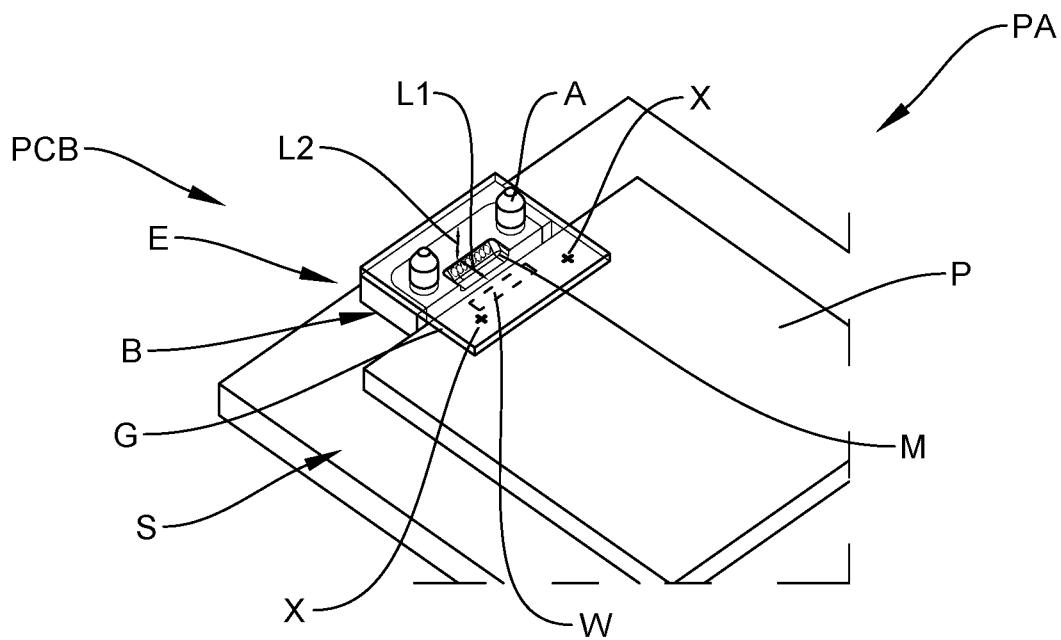
FIG. 1B is a schematic view of attachment of the edge coupler to a PIC in accordance with one embodiment of the present invention.
Figure 1C:
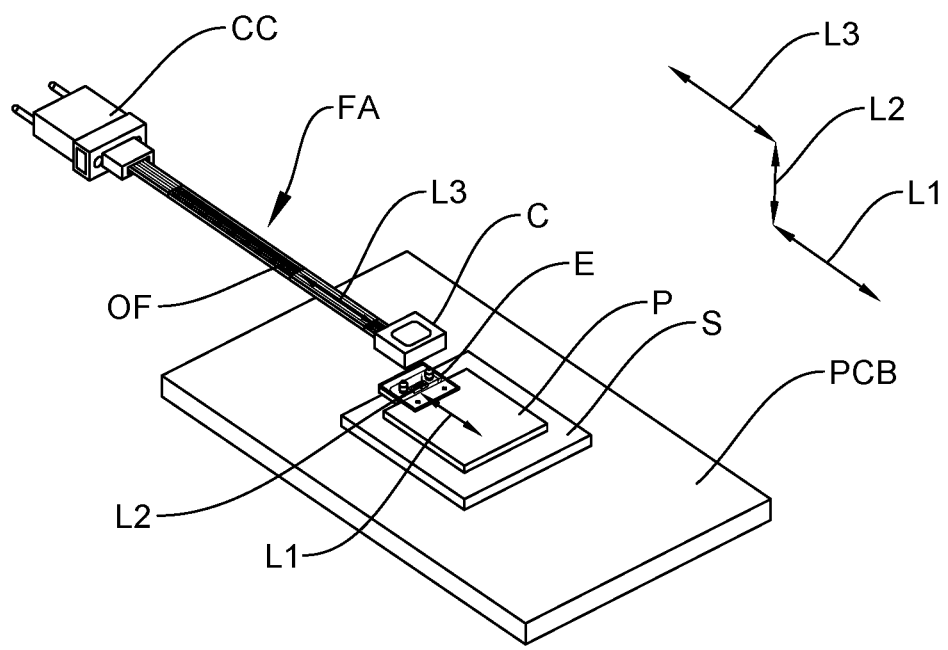
FIG. 1C illustrates demountable coupling of an optical fiber array to the edge coupler of the PIC in accordance with one embodiment of the present invention.
Figure 1C:
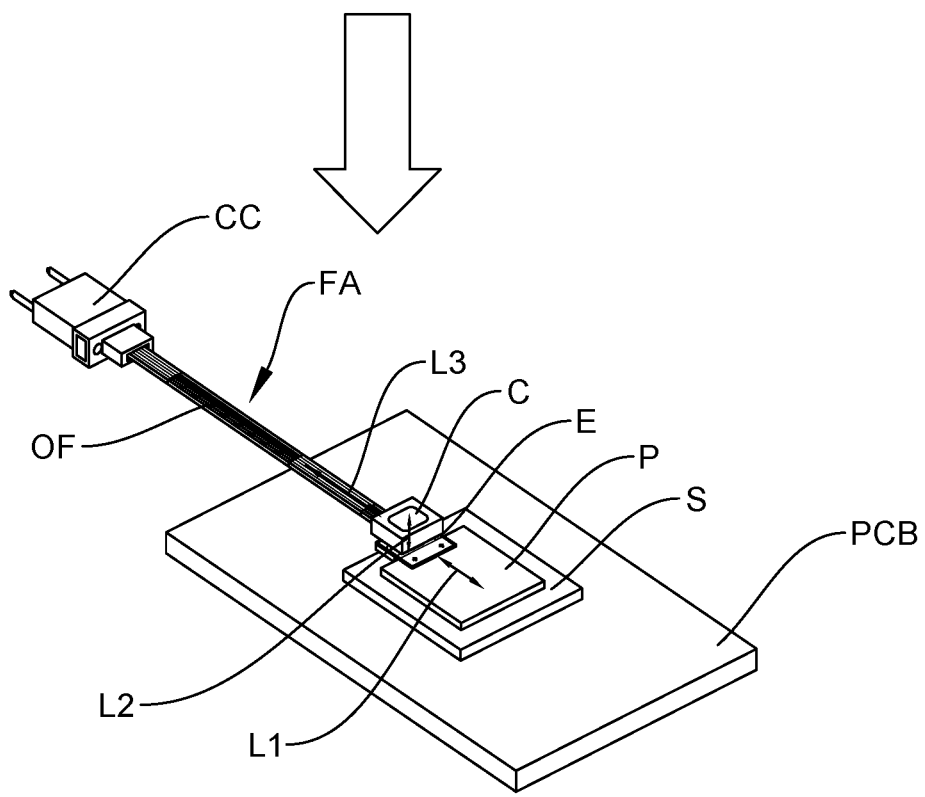
Figure 1D:
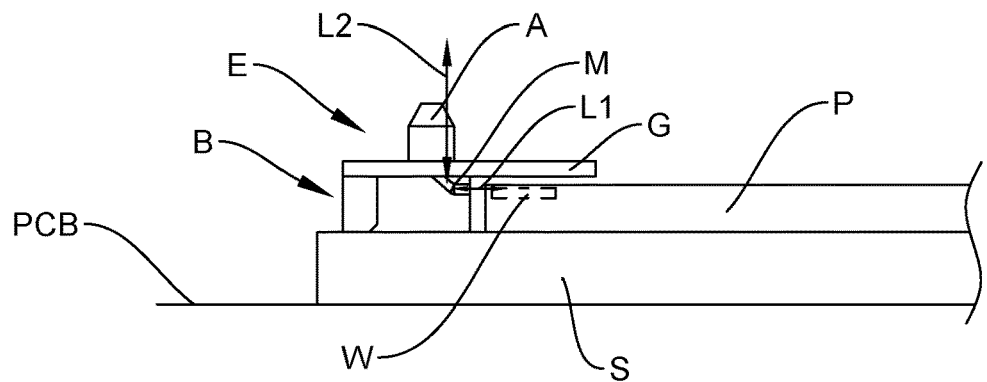
FIG. 1D is a schematic view of attachment of the edge coupler to a PIC in accordance with one embodiment of the present invention.

FIG. 1D is a schematic sectional view of the mirrors M optically aligned with the optical elements W of the PIC chip P along light path L1. The assembly could be made with an intentional gap between the edge of the base B and the facing edge of the PIC chip P. In this case, the gap can be filled with a material that has an optical index of refraction that is similar to that of the core of the optical fiber and waveguide on the PIC chip P. An exemplary material is an index-matching epoxy such as the commercially available EMI/UM epoxy model 3553. Alternatively, the assembly could be constructed without a gap in which case the beam passes through air between the wave guide and the mirror.

The edge coupler E is optically coupled to the edge of the PIC chip P to provide a demountable coupling between the optical fiber array FA and the PIC chip P. More specifically, the demountable coupling is a separable and reconnectable connection between an optical fiber connector C of the optical fiber array FA and the edge coupler C, with the edge coupler E configured and structured to allow the optical fiber connector C to be removed and removably attached for reconnection to the edge coupler E in optical alignment therewith.

FIG. 1B illustrates a photonic apparatus PA that comprises a support S (e.g., an interposer or an integrated circuit (IC) such as a CMOS chip). The PIC chip P is attached to a top surface of the support S, wherein the PIC chip P comprises internal optical elements W (e.g., waveguides; shown schematically in dotted lines in FIG. 1B) routing light to an edge of the PIC chip P to provide an optical interface to external of the PIC chip P. The edge coupler E is fixed (e.g., by solder, epoxy, or laser welding) on the support after achieving alignment (actively or passively as discussed below) with respect to the PIC chip P with the first array of mirrors M in optical alignment with the optical elements W of the PIC chip, and wherein the first light path L1 of the edge coupler E is between a mirror M in the first array of mirrors and a corresponding optical element W in the PIC chip P.

The first array of mirrors M may be disposed in optical alignment with the optical elements W of the PIC chip P by active alignment (not shown) based on light sent between the edge coupler E and the optical elements W of the PIC chip P. In the embodiment shown in FIGS. 1A and 1B, optical alignment of the mirrors M in the edge coupler E and the optical elements W in the PIC chip is achieved by passive alignment of the edge coupler E to the edge of the PIC chip P based on fiducials X provided on an extended section of glass cover G beyond the edge of the base B of the edge coupler E and a top surface near the edge of the PIC chip P. The edge coupler E is passively aligned to the PIC chip P by optically aligning the fiducials X on the glass/quartz/sapphire cover G and the top surface of the PIC chip P.

In one embodiment, each mirror M is an exposed free surface of the base B (i.e., surface exposed to air, or not internal within the body of the base of the optical bench) having an exposed reflective free side facing a corresponding optical element W of the PIC chip P, and wherein the exposed reflective free side comprises the structured reflective surface profile at which light is directed to and from the corresponding optical element W in the PIC chip P. Each mirror M bends, reflects and/or reshapes an incident light. Depending on the geometry and shape (e.g., curvature) of the structured reflective surface profile, the mirrors M may collimate, expand, or focus an incident light beam. For example, the structured reflective surface profile may comprise one of the following geometrical shape/profiles: (a) ellipsoidal, (b) off-axis parabolic, or (c) other free-form optical surfaces. For example, the mirror surface, to provide optical power, may have a surface geometrical curvature function of any of the following, individually, or in superposition: ellipsoidal or hyperbolic conic foci, toroidal aspheric surfaces with various number of even or odd aspheric terms, X-Y aspheric curves with various number of even or off terms, Zernike polynomials to various order, and various families of simpler surfaces encompassed by these functions. The surfaces may also be free-form surfaces with no symmetry along any plane or vector.

In all the described embodiments herein, the structured reflective surfaces may be configured to be flat, concave or convex, or a combination of such to structure a compound reflective surface. In one embodiment, the structured reflective surface has a smooth (having a finish resembling a polished finish) mirror surface. It may instead be a textured surface that is reflective. The structured reflective surface may have a uniform surface characteristic, or varying surface characteristics, such as varying degree of smoothness and/or textures across the surface, or a combination of various regions of smooth and textured surfaces making up the structured reflective surface. The structured reflective surface may have a surface profile and/or optical characteristic corresponding to at least one of the following equivalent optical element: mirror, focusing lens, diverging lens, diffraction grating, or a combination of the foregoing. The structure reflective surface may have a compound profile defining more than one region corresponding to a different equivalent optical element (e.g., a central region that is focusing surrounded by an annular region that is diverging). In one embodiment, the structured reflective surface is defined on an opaque material that does not transmit light through the surface.

The mirrors M may be defined on the base B by stamping a malleable metal material. Various malleable metals, stampable with tool steels or tungsten carbide tools, may compose the body of the mirrors, including any 300 or 400 series stainless steel, any composition of Kovar, any precipitation or solution hardened metal, and any alloy of Ag, Al, Au, Cu. At the long wavelengths above 1310 nm, aluminum is highly reflective (>98%) and economically shaped by stamping. The reflective surface of the portion of the metal comprising the mirror may be any of the metals mentioned above, or any coating of highly reflective metal, applied by sputtering, evaporation, or plating process.

U.S. Pat. No. 7,343,770, commonly assigned to the assignee of the present invention, discloses a novel precision stamping system for manufacturing small tolerance parts. Such inventive stamping system can be implemented to produce the structures of edge couplers disclosed herein (including the structures for the optical bench B discussed above, as well as the structures discussed below). These stamping processes involve stamping a malleable bulk metal material (e.g., a metal blank or stock), to form the final surface features at tight (i.e., small) tolerances, including the reflective surfaces having a desired geometry in precise alignment with the other defined surface features. U.S. Patent Application Publication No. US2016/0016218A1, commonly assigned to the assignee of the present invention, further discloses a composite structure including a base having a main portion and an auxiliary portion of dissimilar metallic materials. The base and the auxiliary portion are shaped by stamping. As the auxiliary portion is stamped, it interlocks with the base, and at the same time forming the desired structured features on the auxiliary portion, such as a structured reflective surface, optical fiber alignment feature, etc. With this approach, relatively less critical structured features can be shaped on the bulk of the base with less effort to maintain a relatively larger tolerance, while the relatively more critical structured features on the auxiliary portion are more precisely shaped with further considerations to define dimensions, geometries and/or finishes at relatively smaller tolerances. The auxiliary portion may include a further composite structure of two dissimilar metallic materials associated with different properties for stamping different structured features. This stamping approach improves on the earlier stamping process in U.S. Pat. No. 7,343,770, in which the bulk material that is subjected to stamping is a homogenous material (e.g., a strip of metal, such as Kovar, aluminum, etc.). The stamping process produces structural features out of the single homogeneous material. Thus, different features would share the properties of the material, which may not be optimized for one or more features. For example, a material that has a property suitable for stamping an alignment feature may not possess a property that is suitable for stamping a reflective surface feature having the best light reflective efficiency to reduce optical signal losses. The disclosed composite structure may be adopted to produce the edge couplers (e.g., in FIGS. 3A, 4A and 5A and 6A) and optical fiber connectors (e.g., FIG. 2B) having an optical bench as disclosed herein.

Figure 2A:
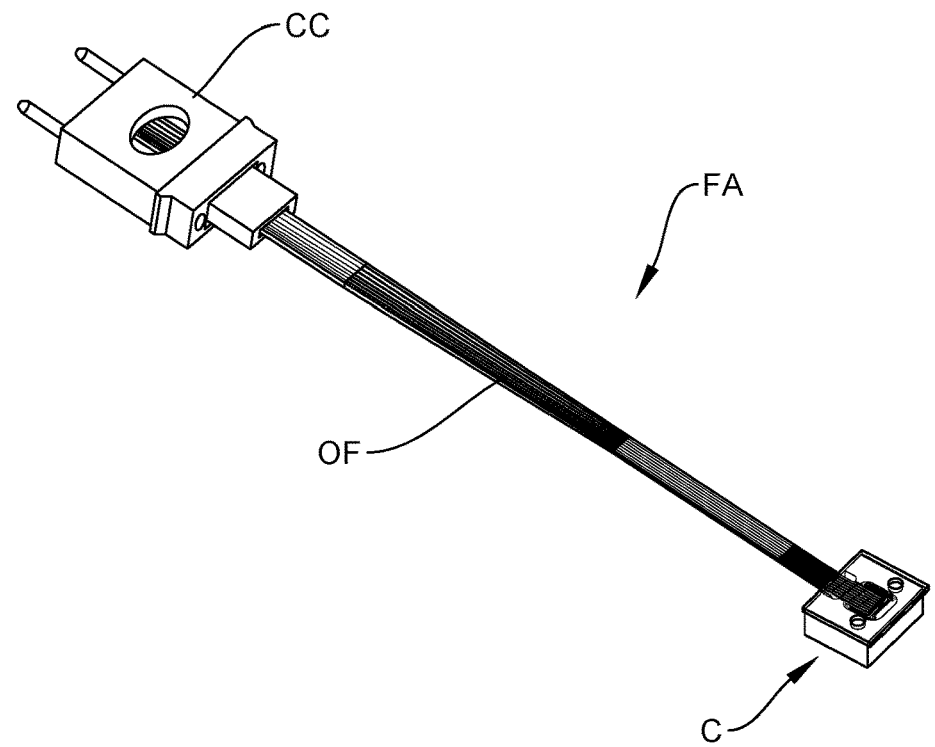
FIG. 2A illustrates an optical fiber array in accordance with one embodiment of the present invention.
Figure 2B:
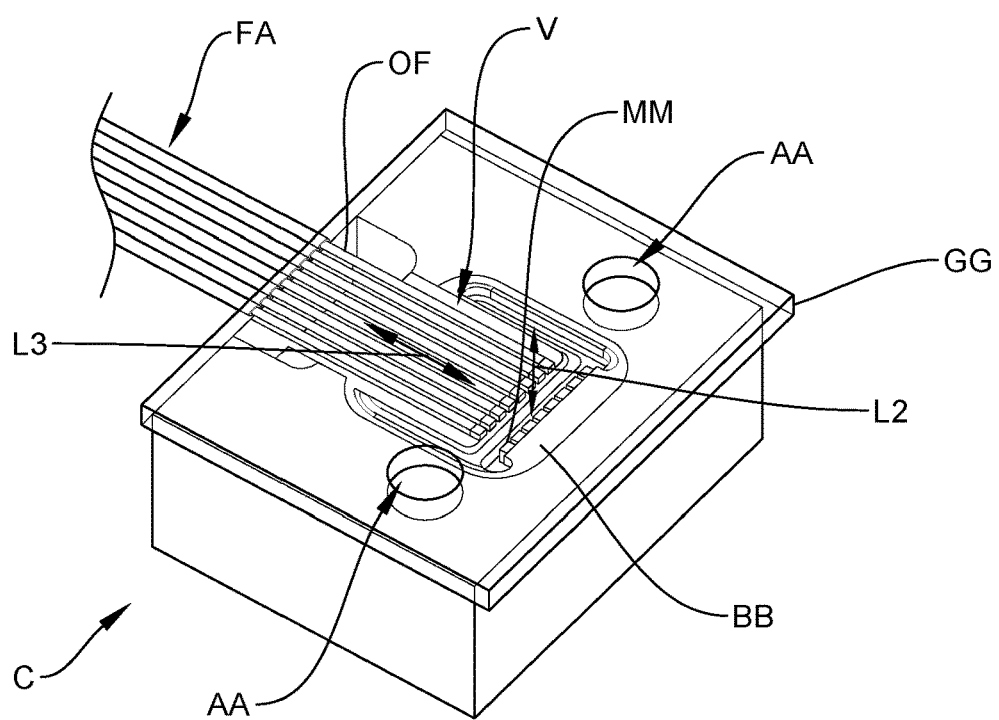
FIG. 2B illustrates an optical connector of the optical fiber array in accordance with one embodiment of the present invention.

Referring to FIGS. 2A and 2B, the optical fiber array FA comprises an optical fiber connector C terminating and supporting the ends of the array/bundle of optical fibers OF in optical alignment with the first array of mirrors M of the edge coupler E, wherein the optical fiber connector C inputs/outputs light in the second direction along the second light path L2. With the optical fiber connector C coupled to the edge coupler E, light between the optical fiber array FA and the optical elements W of the PIC chip P follows a light path comprising at least the first light path L1 and the second light path L2 via the first array of mirrors M in the edge coupler E. A transparent glass, quartz, or sapphire plate GG covers the exposed mirror surfaces MM on the bench BB. In one embodiment, the connector C may be filled with index-matching epoxy between the mirror surfaces MM and the glass plate GG. At the other end of the fiber array FA, a connector CC (e.g., a ferrule connector such as a MT ferrule connector) is provided. The fiber array FA may function as a fiber-optic jumper cable.

Further in the embodiment of FIG. 2B, the optical fiber connector C comprises an optical bench having a base BB that comprises a second array of mirrors MM and grooves V for retaining end sections of optical fibers OF, wherein each mirror MM in the second array of mirrors includes a structured reflective surface profile that turns light between a third light path L3 along a third (horizontal) direction parallel to the first light path L1 in the first (horizontal) direction and the second light path L2 along the second (vertical) direction, to thereby input/output light in the second (vertical) direction along the second light path L2. In this embodiment, with the optical fiber connector C coupled to the edge coupler E as shown in FIG. 1C, light between the optical fiber array FA and the optical elements W of the PIC chip P follows a light path generally defined by the combination of the first light path L1, the second light path L2 and the third light path L3 via the first array of mirrors M in the edge coupler E and the second array of mirrors MM in the optical fiber connector C.

The surface features (mirrors MM and grooves V) on the base BB of the connector C may be formed by stamping, in a similar fashion as discussed in connection with forming the surface features of the base B1 in the edge coupler E1 of FIG. 3A discussed below.

The structured reflective surface profile of the mirrors M and/or the mirrors MINI may be configured to reshape the light beam from the PIC chip P to produce a mode field that more closely match the mode field of the optical fibers in the optical fiber connector C. Further, the mirrors M in the edge coupler E may be configured with a reflective surface profile to expand or collimate the light beams from the optical elements W in the PIC chip P and output to the mirrors MINI in the connector C, and the mirrors MM in the connector C may be configured with a reflective surface profile to focus the light beams from the mirrors M in the edge coupler to focus on core of the tip/end face of the optical fiber OF held in the grooves V on the base BB of the optical bench in the connector C. This expanded beam coupling configuration would reduce optical alignment tolerance requirement between the mirrors M and the optical fibers held in the expanded-beam optical fiber connector C.

Figure 6A:
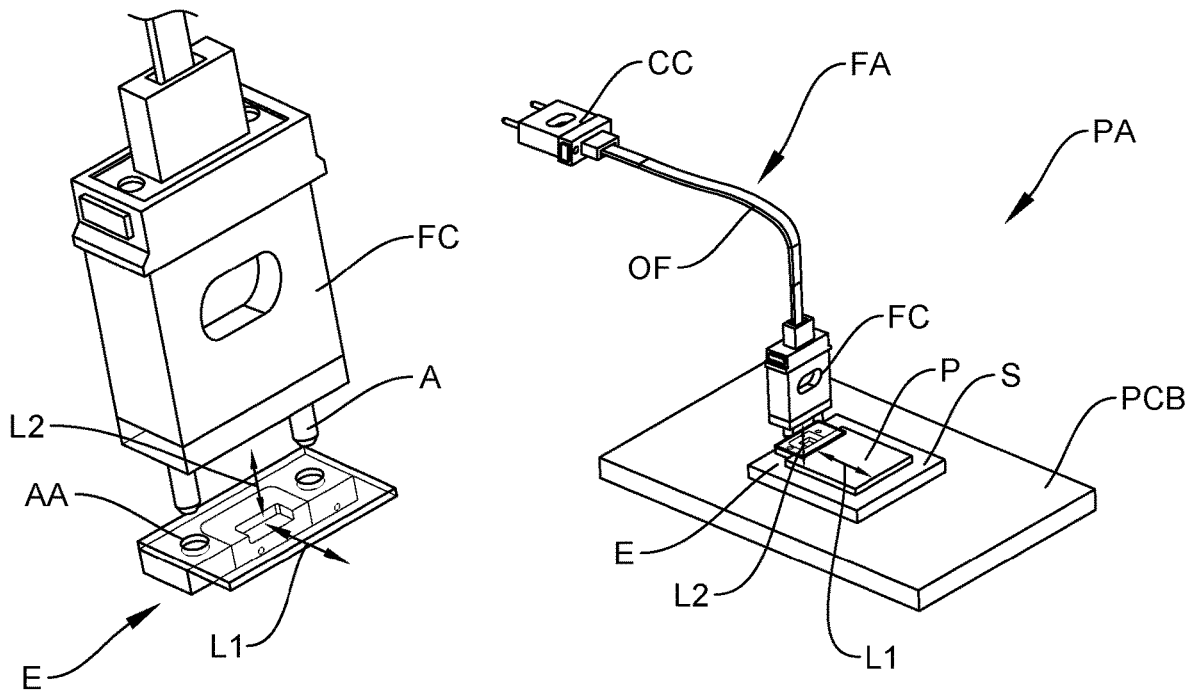
FIG. 6A illustrates an edge coupler in accordance with still another embodiment of the present invention.
Figure 6B:
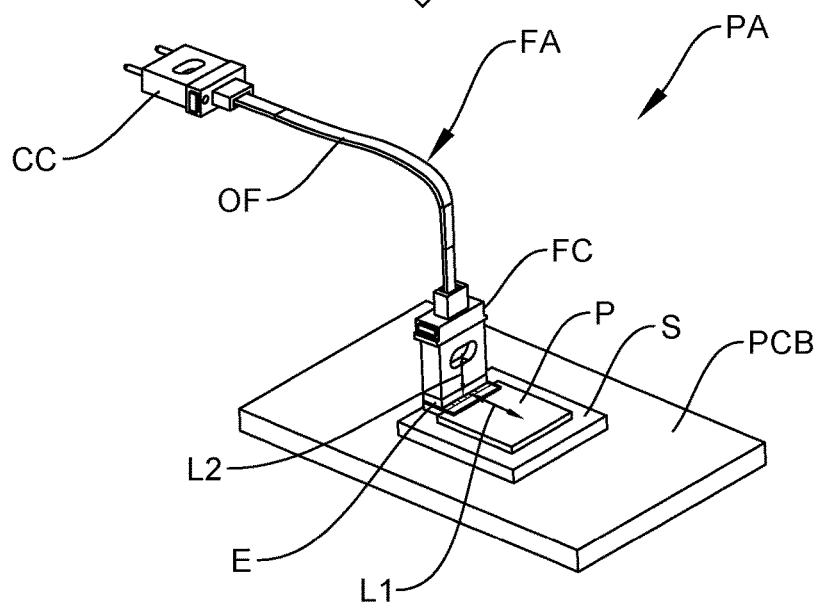
FIG. 6B illustrates demountable coupling of an optical fiber array to the edge coupler of the PIC in accordance with still another embodiment of the present invention.

Alternatively, as shown in FIGS. 6A and 6B, instead of an optical fiber array FA having a connector with an optical bench shown in FIG. 2B, an optical fiber array FA2 having a ferrule connector FC without an optical bench (not shown; e.g., an MT ferrule such as used within MTP and MPO fiber-optic connectors) is used to hold optical fibers with exposed bare end faces for coupling to the edge coupler E. In this embodiment, the structured reflective surface profile of the mirrors M can be configured to reshape the light beam from the PIC chip P to focus the light beams from the PIC chip P directly to core of the exposed tips/end faces of the optical fibers held in the optical fiber ferrule connector FC. In the embodiment shown in FIGS. 6A and 6B, instead of the optical fiber connector C in an optical fiber array FA as in FIG. 2B, the optical fiber connector FC comprises a structure to support the optical fibers to input/output light in the second direction along the second (vertical) light path L2, wherein with the optical fiber connector FC demountably coupled to the edge coupler E, light between the optical fiber array FA and the optical elements W of the PIC chip P follows a light path defined by only the first light path L1 and the second light path L2 via the first array of mirrors M in the edge coupler E.

The optical fiber connector FC may be in the form of an optical fiber ferrule connector (e.g., a MT ferrule), which holds the optical fibers therein in a vertical, perpendicular direction to the top surface of the PIC chip P. In this embodiment, the tips of the optical fibers OF in the ferrule connector FC would be in physical contact with the glass plate G of the edge coupler E.

If the ferrule connector FC is of the expanded-beam type without an optical bench, the structured reflective surface profile of the mirrors M can be configured to reshape the light beams from the PIC chip P to expand the light beams so as to reduce optical alignment tolerance requirement between the mirrors M and the optical fibers held in the expanded-beam optical fiber connector FC. In this embodiment, the tips of the optical fibers OF in the ferrule connector FC need not be, but can be, in physical contact with the glass plate G of the edge coupler E. In this embodiment, the base B of the edge coupler E is provided with alignment holes AA instead of alignment pins A, to accommodate the complementary alignment pins A on the ferrule connector FC.

Various designs or modifications of the reflective surface profile of the mirrors M in the edge coupler and/or the mirrors MM in the optical fiber connector C may be made to obtain the desired beam shape/geometry.

In FIGS. 1B and 2B, the optical fiber connector C comprises a passive alignment structure AA complementary to the passive alignment structure A on the edge coupler E, and wherein the optical fiber connector is C demountably coupled to the edge coupler by passive alignment based on the complementary passive alignment structures A and AA on the optical fiber connector C and the edge coupler E, to optically couple the optical fiber array FA with the optical elements W of the PIC chip P via the edge coupler E, as shown in FIG. 1C. In one embodiment, the passive alignment structure A on the edge coupler E may comprise at least one of alignment pins, alignment pin holes and surface features (not shown) to provide a kinematic coupling, a quasi-kinematic coupling or an elastic averaging coupling. The complementary passive alignment structure AA on the optical fiber connector may comprise at least one of complementary alignment pin holes, alignment pins, and surface features (not shown) to provide a kinematic coupling, a quasi-kinematic coupling or an elastic averaging coupling, complementary to the corresponding passive alignment structure of the edge coupler. US Patent Publication No. US2016/0161686A1, commonly assigned to the assignee of the present invention, discloses demountable optical connector structure including examples of kinematic coupling, quasi-kinematic coupling and elastic averaging coupling.

In the embodiment of FIGS. 1A to 1C, the edge coupler E is a free space edge coupler without any optical element (e.g., optical fiber section) between the first array of mirrors M and the optical elements W at the edge of the PIC chip P.

In another embodiment shown in FIGS. 3A to 3D, the base B1 of the optical bench in the edge coupler E1 includes a base B1 having an array of mirrors M1 and an array of grooves V1 each receiving a section of optical fiber F (in the form of a short fiber stub) with its longitudinal axis along the first light path L1. One end of the fiber stub F faces and in optical alignment with a corresponding mirror M1 along the first light path L1 and another end faces and in optical alignment with a corresponding optical element W in the PIC chip, wherein the grooves V1 in the base B1 terminates at an edge of the base B1 of the edge coupler E1 facing the edge of the PIC chip P. In one embodiment, the section of optical fiber F terminates substantially at the edge of the base B1 of the edge coupler E1, wherein the end faces of the optical fiber F may be slightly protruding from or receding from the edge of the base B1 of the edge coupler E. A glass, quartz, or sapphire plate G1 covers the exposed mirrors M1 on the base B1 of the edge coupler E1 (and extending from the edge of the base B1 for passive fiducial alignment, as explained below). In one embodiment, the edge coupler E1 may be filled with index-matching epoxy between the mirror surfaces M1 and the glass plate G.

Figure 3D:
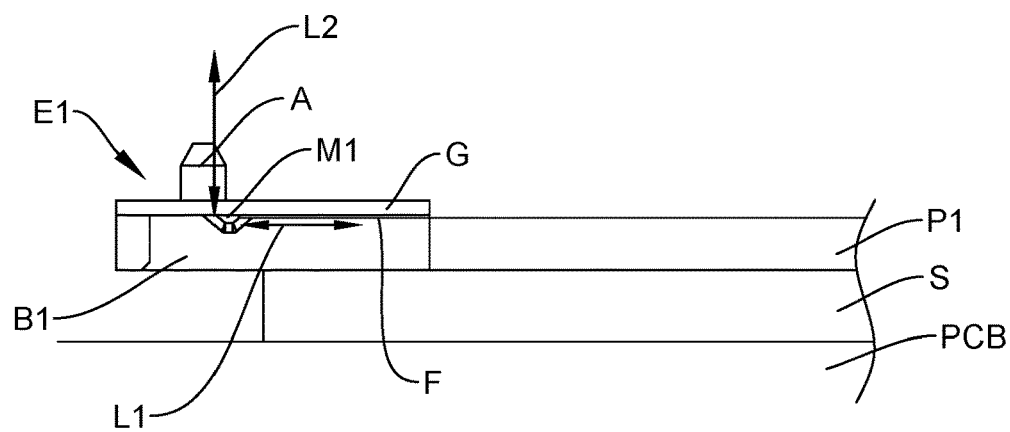
FIG. 3D is a schematic view of attachment of the edge coupler to a PIC in accordance with another embodiment of the present invention.

FIG. 3D is a schematic sectional view of a groove containing the fiber stub F and the optical elements W of the PIC chip P. The fiber stubs F are polished at the edge of the base B1 (and/or covered by a glass cover, not shown) to act like a fiber array against the optical elements W in the PIC chip P. The assembly could be made with an intentional gap between the edge of the base B1 and the facing edge of the PIC chip P. In this case, the gap can be filled with a material that has an optical index of refraction that is similar to that of the core of the optical fiber and waveguide on the PIC chip P. An exemplary material is an index-matching epoxy such as the commercially available EMI/UM epoxy model 3553. Alternatively, the assembly could be constructed without a gap in which case the beam passes through air between the wave guide and the mirror.

In this embodiment, each fiber stub F serves as an optical filter between respective optical elements W and the mirror M1. The mode field of the light beams from the optical elements W to the mirrors M1 may not be matched. Each fiber stub F reshapes by correcting and/or conditioning the mode field of the light beam for the mirror M1, to thereby standardize the light beam to known conditions at the mirror M1. Accordingly, the mirror M1 can be designed based on such known conditions, thus avoiding issues faced with non-standard conditions based on direct light beam from the optical element W in the PIC chip P.

In comparison, the previous embodiment of FIGS. 1A to 1D requires knowledge of the mode field and other optical characteristics of the PIC chip P, in order to match the profile of the mirrors M to the interfacing optical elements W in the PIC chip P.

In a further embodiment, the fiber stub may be of a polarization-maintaining optical fiber, to restrict polarization of the light beam from the PIC chip P to the mirrors M1.

Figure 3A:
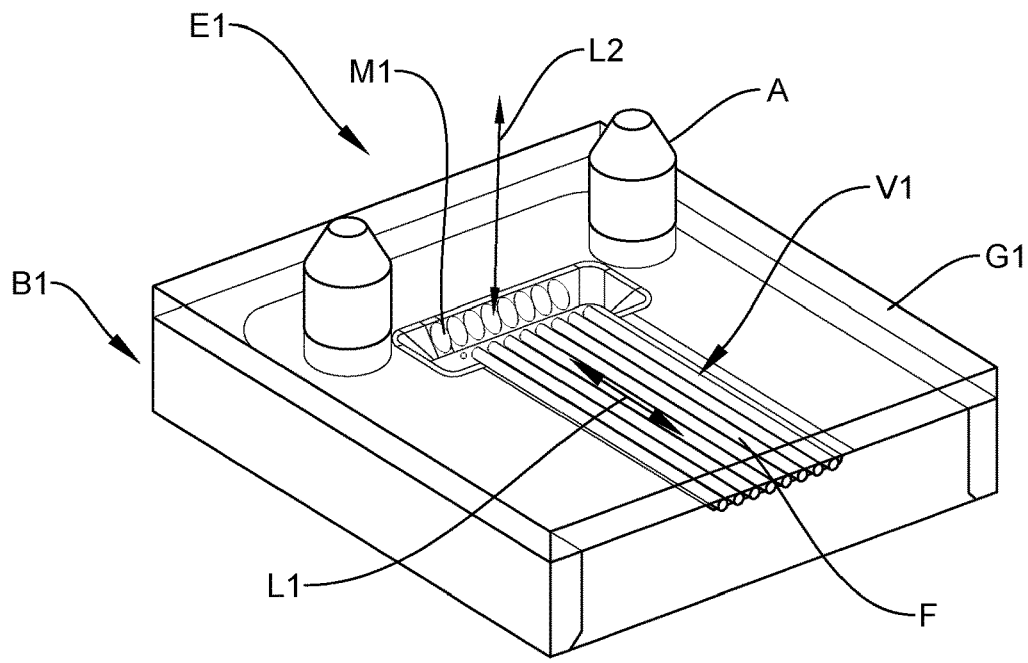
FIG. 3A illustrates an edge coupler in accordance with another embodiment of the present invention.
Figure 3B:
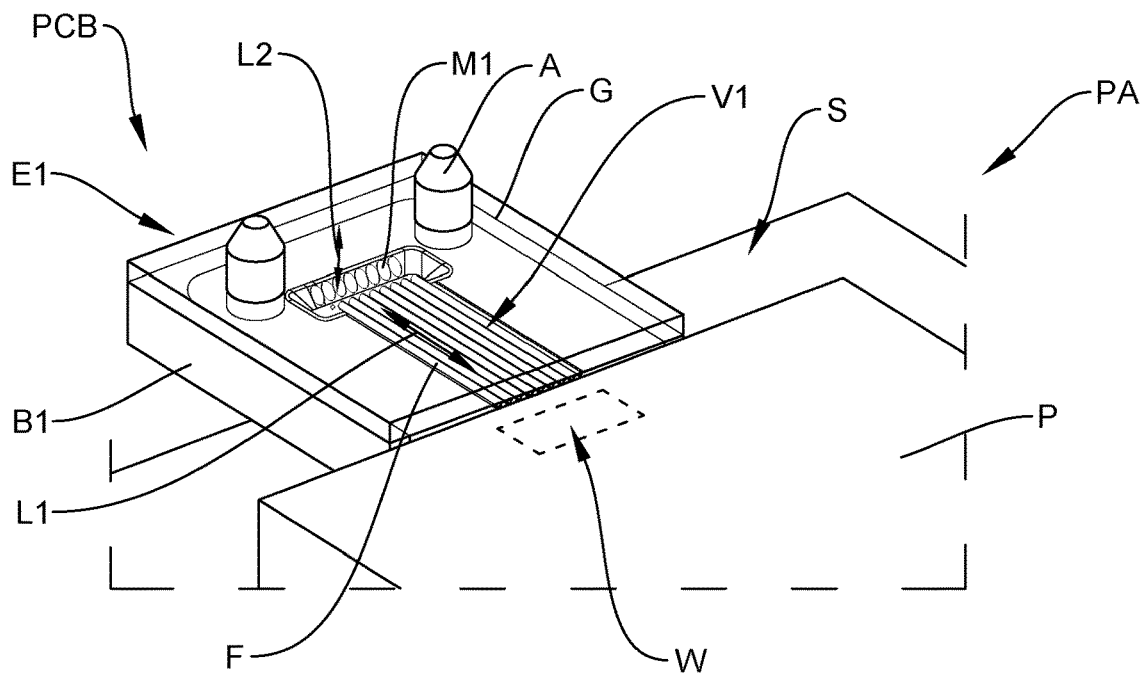
FIG. 3B is a schematic sectional view of the disposition of the edge coupler to the edge of the PIC chip in accordance with another embodiment of the present invention.

In the embodiment of FIG. 3A, the fiber stubs F may each have a length of 2 mm, with the overall length of the base along the same direction being about 3 to 4 mm.

In this embodiment, the open grooves V1 retains bare sections of optical fiber stubs F (having cladding exposed, without protective buffer and jacket layers), and the mirrors M1 with structured reflective surfaces have a plane generally inclined at an angle relative to the greater plane of the base B1, having a structured reflective surface profile as discussed in connection with the previous embodiment of FIG. 1A. The open grooves V1 are sized to receive and are located to precisely position the end section of the fiber stubs F in alignment with respect to the mirrors M1 along the first light path L1. The end face of each fiber stub F facing a corresponding mirror M1 is maintained at a pre-defined distance with respect to a corresponding mirror M.

In an embodiment, the surface features (mirrors/structured reflective surfaces M1 and the optical fiber alignment grooves V1) on the base B1 can be integrally/simultaneous formed by precision stamping of a stock material (e.g., a metal blank or strip), which allows the connector components to be produced economically in high or small volumes, while improving tolerance, manufacturability, ease of use, functionality and reliability. By forming the mirrors M1, and the grooves V1 simultaneously in a same, single final stamping operation, dimensional relationship of all features requiring alignment on the same work piece/part can be maintained in the final stamping step. Instead of a punching operation with a single strike of the punch to form all the features on the base B1 of the optical bench, it is conceivable that multiple strikes may be implemented to progressive pre-form certain features on the base B1, with a final strike to simultaneously define the final dimensions, geometries and/or finishes of the various structured features on the base B1 of the optical bench, including the mirrors M1, and fiber alignment grooves V1, that are required to ensure (or play significant role in ensuring) proper alignment of the respective components/structures along the design light path L1.

The Assignee of the present invention, nanoPrecision Products, Inc., developed various proprietary optical coupling/connection devices having optical benches used in connection with optical data transmission. The present invention is more specifically directed to detachably/reconnectably edge couplers for PICs, while adopting similar concept of stamping optical benches including stamped mirrors practiced in the earlier optical coupling devices.

For example, US2013/0322818A1, commonly assigned to the assignee of the present invention, discloses an optical coupling device having a stamped structured surface for routing optical data signals, in particular an optical coupling device for routing optical signals, including a base; a structured surface defined on the base, wherein the structured surface has a surface profile that reshapes and/or reflect an incident light; and an alignment structure defined on the base, configured with a surface feature to facilitate positioning an optical component on the base in optical alignment with the structured surface to allow light to be transmitted along a defined path between the structured surface and the optical component, wherein the structured surface and the alignment structure are integrally defined on the base by stamping a malleable material of the base. Further, the processes discussed in the other disclosures early discussed above relating to stamping composite structures may be adopted for forming the surface features (mirrors M1 and grooves V1) on the base B1 of the edge coupler E1.

The edge coupler E1 is optically aligned to the edge of the PIC chip P by means of active alignment. The edge coupler E1 is fixed in position on the support S by solder or epoxy upon achieving the desired optical alignment. Alternatively, passive alignment can be accomplished using an extended glass plate provided with a pattern of fiducials to be optically aligned with complementary pattern of fiducials provide on the top of the PIC chip P, as discussed above with respect to the earlier embodiment of FIGS. 1A to 1D.

Similar passive alignment structures A may be provided on the edge coupler E1 for demountable coupling to a connector C of an external optical fiber array FA (see, FIG. 3C), as in the earlier embodiment.

Figure 3C:
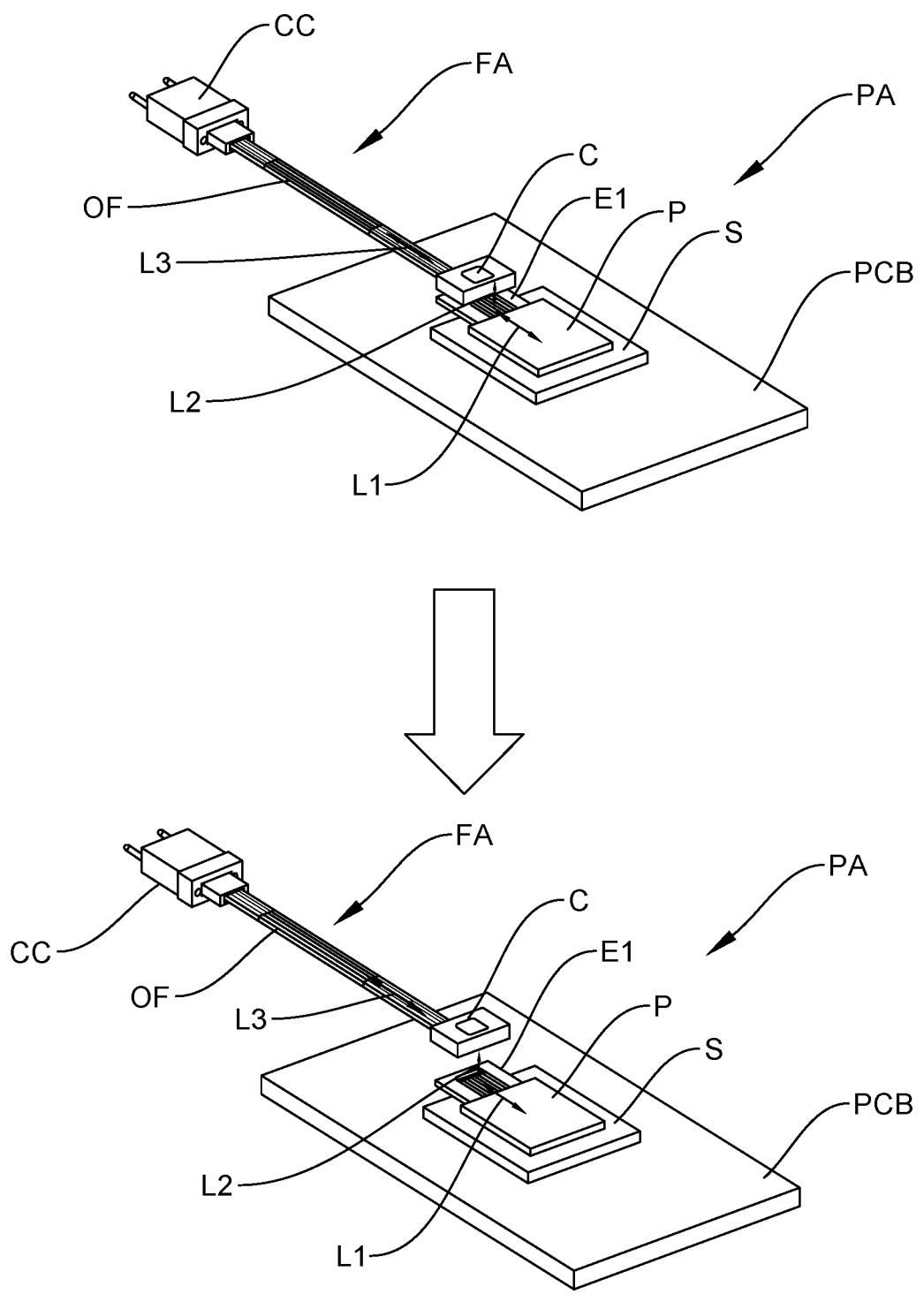
FIG. 3C illustrates demountable coupling of an optical fiber array to the edge coupler of the PIC in accordance with another embodiment of the present invention.
Figure 4D:
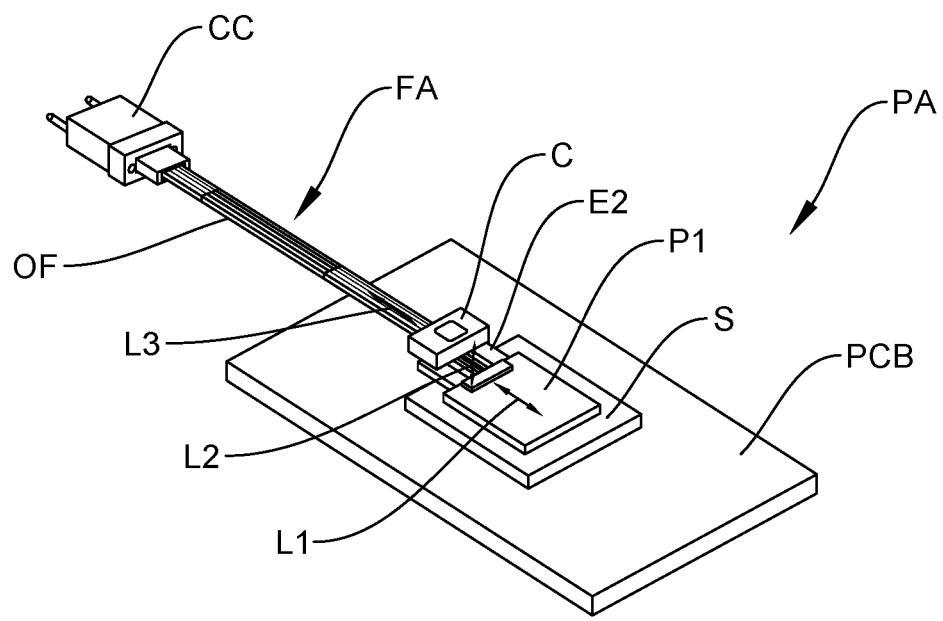
FIG. 4D illustrates demountable coupling of an optical fiber array to the edge coupler of the PIC in accordance with a further embodiment of the present invention.
Figure 4D:
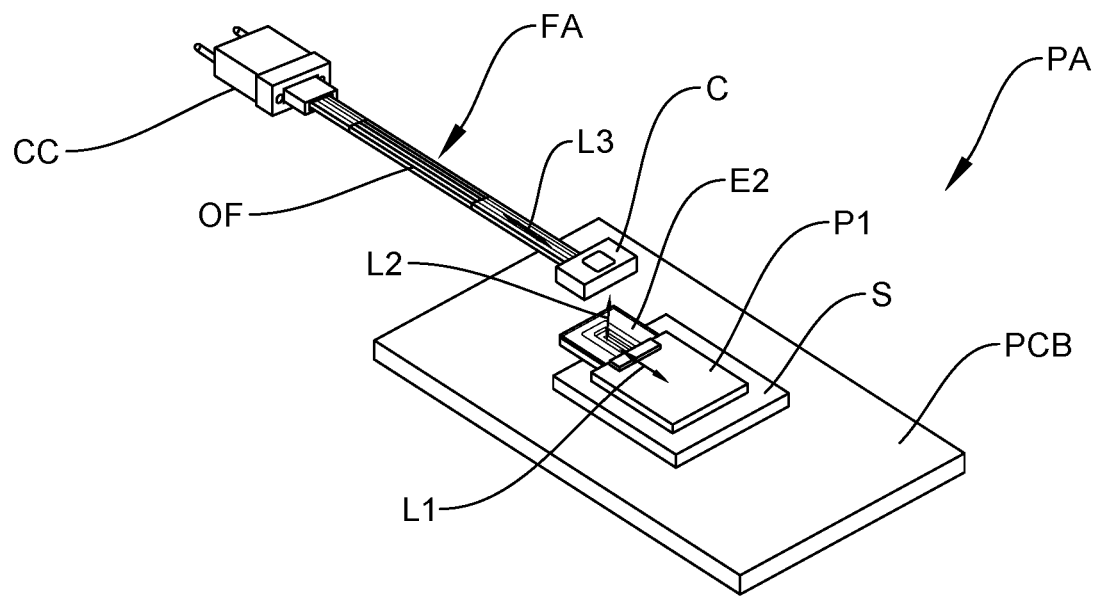
Figure 5A:
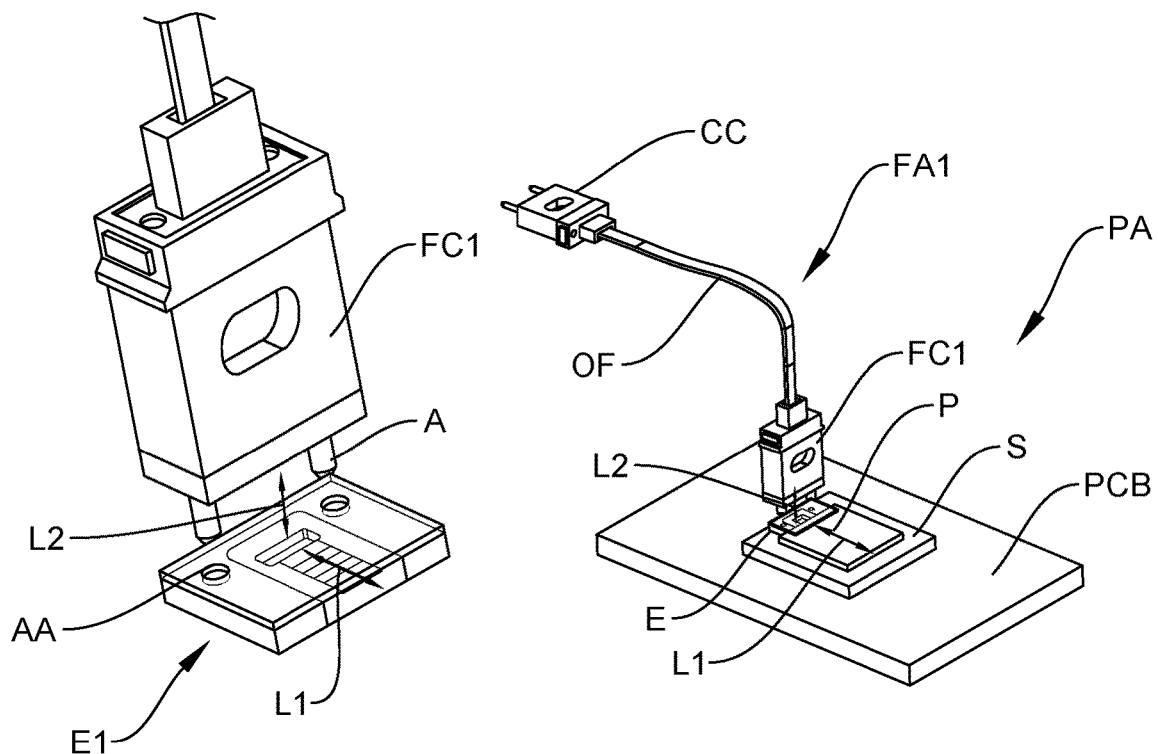
FIG. 5A illustrates an edge coupler in accordance with yet another embodiment of the present invention.
Figure 5B:
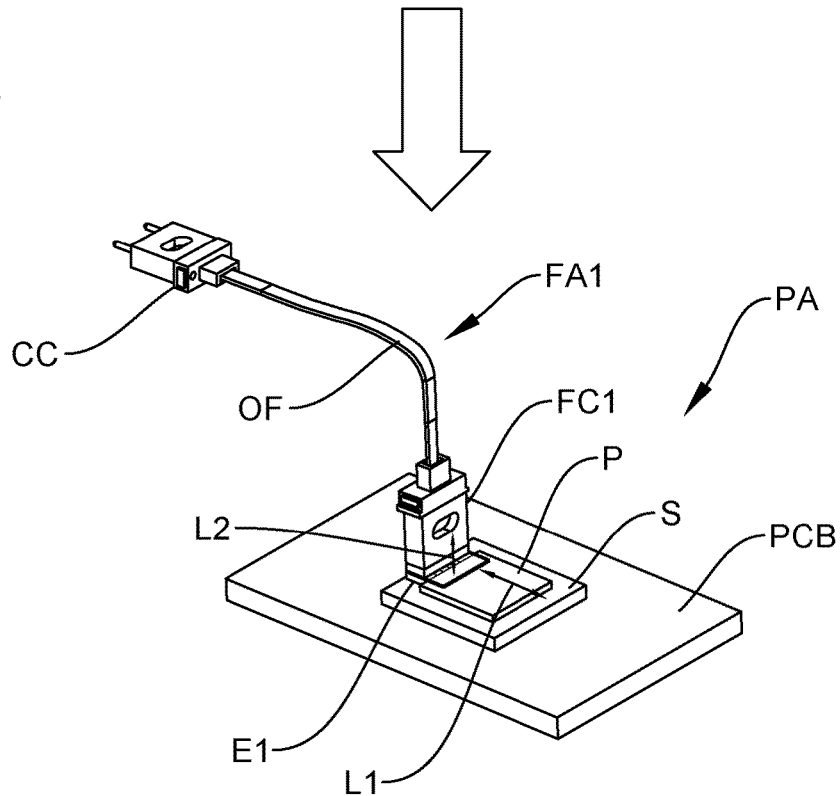
FIG. 5B illustrates demountable coupling of an optical fiber array to the edge coupler of the PIC in accordance with another embodiment of the present invention.

In the embodiment shown in FIGS. 5A and 5B, instead of the optical fiber connector C in an optical fiber array FA as in FIG. 3C, the optical fiber connector FC1 comprises a structure to support the optical fibers to input/output light in the second direction along the second (vertical) light path L2, wherein with the optical fiber connector FC1 demountably coupled to the edge coupler E1, light between the optical fiber array FA1 and the optical elements W of the PIC chip P follows a light path defined by only the first light path L1 and the second light path L2 via the first array of mirrors M1 in the edge coupler E1. The optical fiber connector FC1 may be in the form of an optical fiber ferrule connector (e.g., a MT ferrule), which holds the optical fibers therein in a vertical, perpendicular direction to the top surface of the PIC chip P. In this embodiment, the tips of the optical fibers OF in the ferrule connector FC1 would be in physical contact with the glass plate G of the edge coupler E1. In the illustrated embodiment, the base B1 of the edge coupler E1 is provided with alignment holes AA instead of alignment pins A, to accommodate the complementary alignment pins A on the ferrule connector FC1.

If the ferrule connector FC1 is of the expanded-beam type without an optical bench, the structured reflective surface profile of the mirrors M1 can be configured to reshape the light beams from the PIC chip P to expand the light beams so as to reduce optical alignment tolerance requirement between the mirrors M1 and the optical fibers held in the expanded-beam optical fiber connector FC1. In this embodiment, the tips of the optical fibers OF in the ferrule connector FC1 need not be, but can be, in physical contact with the glass plate G of the edge coupler E1.

FIGS. 4A to 4E illustrates a variation of the embodiment of FIGS. 3A to 3D. In this embodiment, the base B1 of optical bench of the edge coupler E2 is similar in structure to the base B1 in the preceding embodiment. The difference in this embodiment is that each section of optical fiber F1 (fiber stub) includes an extended section XF extending beyond the edge of the base B1, wherein the extended section XF is received in an alignment groove PV provided at the edge of the PIC chip P1. The grooves PV are optically aligned to the optical elements W in the PIC chip P. Accordingly, the extended end of each extended section XF is in optical alignment with a corresponding optical element W in the PIC chip P1. Given the alignment grooves PV passively align the extended sections XF of the fiber stubs F1, separate alignment of the edge adaptor E2 to the PIC chip C would not be necessary. In this embodiment, a holder plate H is provided to clamp the extended section XF in the groove PV provided at the edge of the PIC chip P.

Figure 4E:
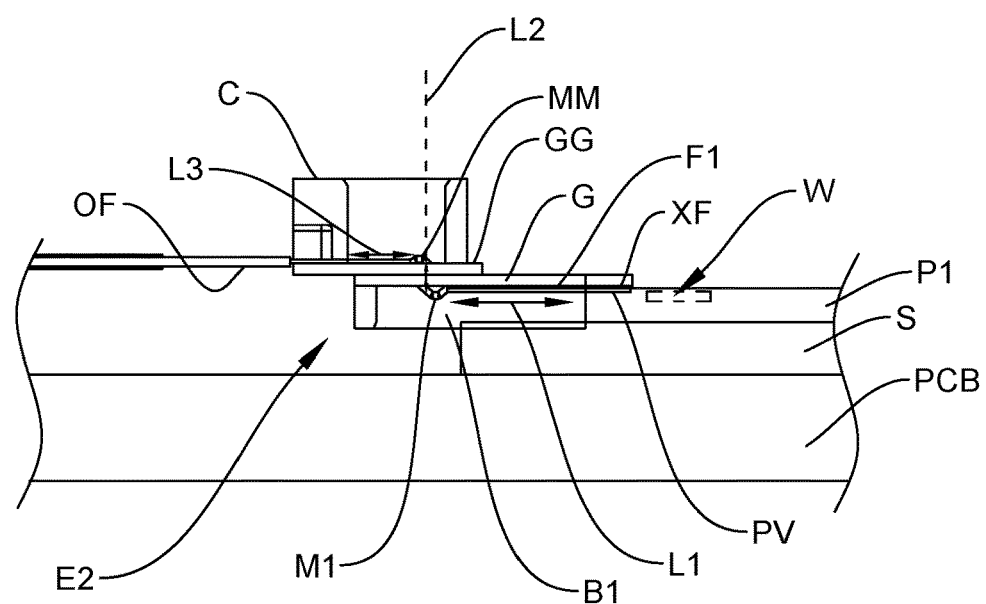
FIG. 4E is a schematic sectional view of the disposition of the edge coupler to the edge of the PIC chip in accordance with the further embodiment of the present invention.

FIG. 4E is a schematic sectional view of a groove containing the fiber stub F1 in alignment with the optical elements W of the PIC chip P1. The fiber stubs F1 are polished at the ends to act like a fiber array against the optical elements W in the PIC chip P1.

Similar passive alignment structures A may be provided on the edge coupler E2, for demountable coupling to a connector C of an external optical fiber array FA, as in earlier embodiments.

Figure 7A:
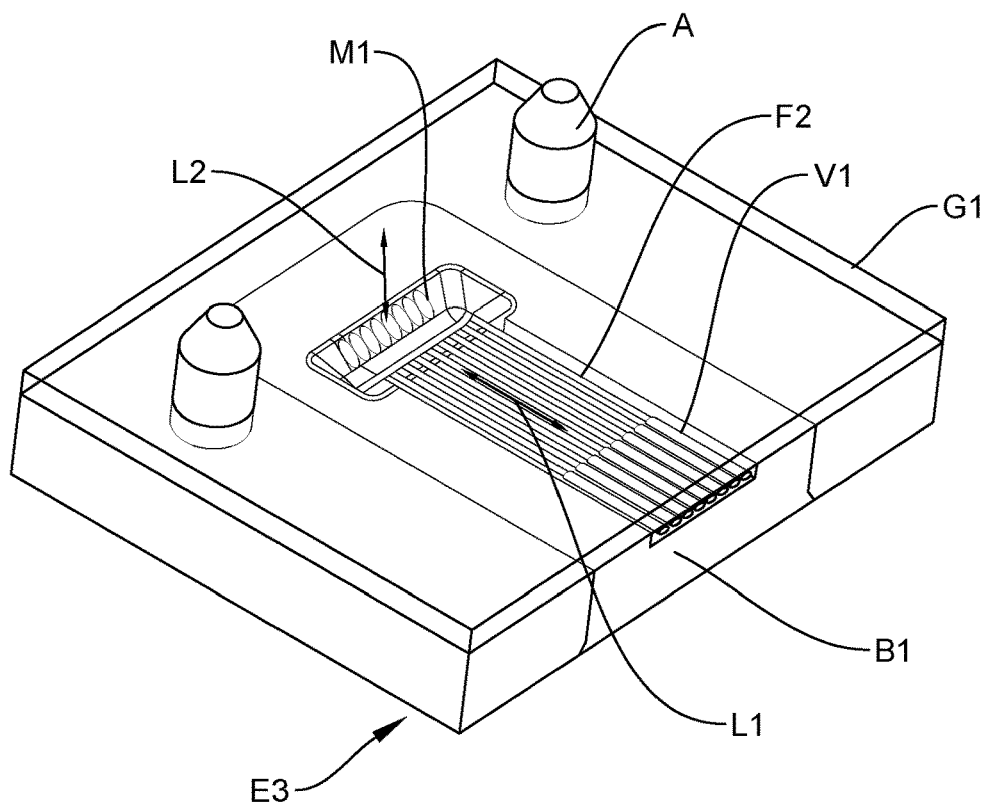
FIG. 7A illustrates an edge coupler having a gradient-index (GRIN) lens in accordance with an embodiment of the present invention.
Figure 7B:
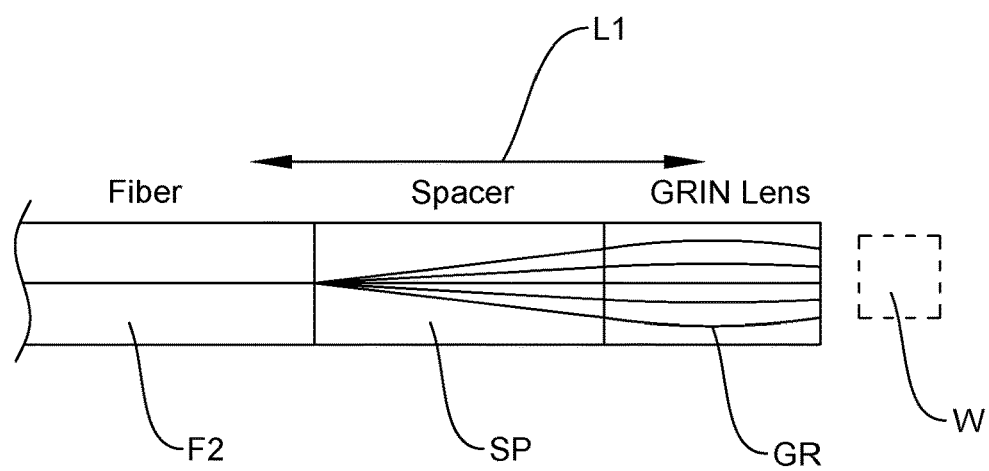
FIG. 7B schematically illustrates the GRIN lens focusing light to the end of an optical fiber.

FIGS. 7A and 7B is another variation of the embodiment of FIG. 3A to 3D. In this further embodiment, the base B1 of optical bench of the edge coupler E3 is similar in structure to the base B1 in the preceding embodiment. The difference in this embodiment is that each groove V1 receives a gradient index (GRIN) lens GR in optical alignment with one end of the section of optical fiber F2 (fiber stub) along the first light path L1. As is well known in the art, a GRIN lens produces optical effects by a gradient of the refractive index of a material. Gradual refractive index variation can be used to produce lenses with flat surfaces, or lenses that do not have the aberrations typical of traditional spherical lenses. GRIN lenses may have a refraction gradient that is spherical, axial or radial. In this embodiment, the GRIN lens GR converges light from a corresponding optical element W in the PIC chip P to the core of the end of the fiber stub F2 or diverges light from the end of the fiber stub F2 to the corresponding optical element W in the PIC chip P. The GRIN lens GR achieves focus by a gradual variation of the refractive index of lens material. The GRIN lens GR may be separated from fiber stub F2 by a spacer SP (air or physical). In this embodiment, the mirrors M1 may have similar or different geometries/shapes as compared to the earlier embodiments of edge couplers E and E2, in view of the combination of the fiber stub F2 and GRIN lens GR instead of a straight fiber stub F and F1.

The first light path L1, the second light path L2 and the third light path L3 for all embodiments discussed above are bi-directional.

In the embodiment of the edge couplers E1, E2 and E3 with grooves and mirrors, the grooves and the mirror array may be integrally defined on the base of the edge coupler by stamping a unitary, monolithic block (e.g., a stock metal material or metal blank) of malleable metal material, to integrally and simultaneously form the reflective surfaces and optical fiber alignment grooves, using the processes discussed above.

The support of the PIC chip may be an interposer or an integrated circuit, which may be supported on a printed circuit board (PCB).

While the invention has been particularly shown and described with reference to the preferred embodiments, it will be understood by those skilled in the art that various changes in form and detail may be made without departing from the spirit, scope, and teaching of the invention. Accordingly, the disclosed invention is to be considered merely as illustrative and limited in scope only as specified in the appended claims.

We claim:
1. A photonic apparatus comprising:
a support;
a photonic integrated circuit (PIC) chip attached to a top surface of the support, wherein the PIC chip comprises optical elements routing light to an edge of the PIC chip to provide an optical interface to external of the PIC chip;
an edge coupler comprises a micro-mirror optical bench, which comprises:
a base;
a first array of mirrors defined on the base, wherein each mirror includes a structured reflective surface profile that turns light between a first light path along a first direction in a plane substantially parallel to the top surface and a second light path along a second direction outside the plane; and a passive alignment structure on the base for demountable coupling to an optical fiber connector of an external optical fiber array, wherein the edge coupler is supported on the support with an edge of the base against an edge of the PIC chip, wherein the edge coupler is in alignment with respect to the PIC chip with the first array of mirrors in optical alignment with the optical elements of the PIC chip, and wherein the first light path is between a mirror in the first array of mirrors and a corresponding optical element in the PIC chip.

2. The photonic apparatus as in claim 1, wherein each mirror is an exposed free surface of the base having an exposed reflective free side facing a corresponding optical element of the PIC chip, and wherein the exposed reflective free side comprises the structured reflective surface profile at which light is directed to and from the corresponding optical element in the PIC chip.

3. The photonic apparatus as in claim 1, wherein the structured reflective surface profile comprises one of the following profiles: (a) ellipsoidal, (b) off-axis parabolic, or (c) other free-form optical surfaces.

4. The photonic apparatus as in claim 1, wherein the base is made of a metal material, and the first array of mirrors is defined on the base by stamping a malleable metal material.

5. The photonic apparatus as in claim 1, wherein the base includes an array of grooves each receiving a section of optical fiber with its longitudinal axis along the first light path, with a first end in optical alignment with a corresponding mirror along the first light path and a second end in optical alignment with a corresponding optical element in the PIC chip, wherein the grooves in the base terminates at an edge of the base of the edge coupler facing the edge of the PIC chip.

6. The photonic apparatus as in claim 5, wherein the section of optical fiber includes an extended section extending beyond the edge of the base of the edge coupler, wherein the extended section is received in a groove at the edge of the PIC chip with an extended end of the extended section corresponds to the second end in optical alignment with a corresponding optical element in the PIC chip.

7. The photonic apparatus as in claim 5, wherein each groove further receives a gradient index (GRIN) lens in optical alignment with the section of optical fiber received in the respective groove along the first light path, wherein the GRIN lens converges light from a corresponding optical element in the PIC chip to the second end of the section of optical fiber or diverges light from the second end of the section of optical fiber to the corresponding optical element in the PIC chip.

8. The photonic apparatus as in claim 5, wherein the base is made of metal, and the grooves and the first array of mirrors are integrally defined on the base by stamping a malleable metal material.

9. The photonic apparatus as in claim 1, wherein the edge coupler is a free space edge coupler without any optical element between the first array of mirrors and the optical elements at the edge of the PIC chip.

10. A photonic apparatus, comprising:
a support;
a photonic integrated circuit (PIC) chip attached to a top surface of the support, wherein the PIC chip comprises optical elements routing light to an edge of the PIC chip to provide an optical interface to external of the PIC chip;
an edge coupler comprises a micro-mirror optical bench, which comprises:
a base;
a first array of mirrors defined on the base, wherein each mirror includes a structured reflective surface profile that turns light between a first light path along a first direction in a plane substantially parallel to the top surface and a second light path along a second direction outside the plane;
a passive alignment structure on the base for demountable coupling to an optical fiber connector of an external optical fiber array,
wherein the edge coupler is supported on the support in alignment with respect to the PIC chip with the first array of mirrors in optical alignment with the optical elements of the PIC chip, and wherein the first light path is between a mirror in the first array of mirrors and a corresponding optical element in the PIC chip,
wherein the edge coupler further comprises the optical fiber array, wherein the optical fiber array comprises an optical fiber connector terminating and supporting the ends of an array of optical fibers in optical alignment with the first array of mirrors of the edge coupler, wherein the optical fiber connector inputs/outputs light in the second direction along the second light path, wherein with the optical fiber connector coupled to the edge coupler, light between the array of optical fibers and the optical elements of the PIC chip follows a light path defined by the first light path and the second light path via the first array of mirrors in the edge coupler, and wherein the structured reflective surface profile of the mirrors is configured to reshape light from the PIC chip to match mode field of the array of optical fibers in the optical fiber connector.

11. The photonic apparatus as in claim 10, wherein the optical fiber connector comprises a structure to support the array of optical fibers to input/output light in the second direction along the second light path, wherein with the optical fiber connector coupled to the edge coupler, light between the array of optical fibers and the optical elements of the PIC chip follows a light path defined by the first light path and the second light path via the first array of mirrors in the edge coupler.

12. The photonic apparatus as in claim 11, wherein the optical fiber connector further comprises an optical bench comprising a second array of mirrors, wherein each mirror in the second array of mirrors includes a structured reflective surface profile that turns light between a third light path along a third direction parallel to the first direction and the second light path along the second direction, to thereby input/output light in the second direction along the second light path, wherein with the optical fiber connector coupled to the edge coupler, light between the array of optical fibers and the optical elements of the PIC chip follows a light path defined by the first light path, the second light path and the third light path via the first array of mirrors in the edge coupler and the second array of mirrors in the optical fiber connector.

13. The photonic apparatus as in claim 10, wherein the optical fiber connector comprises a passive alignment structure complementary to the passive alignment structure on the edge coupler, and wherein the optical fiber connector is demountably coupled to the edge coupler by passive alignment based on the complementary passive alignment structures on the optical fiber connector and the edge coupler, to optically couple the array of optical fibers with the optical elements of the PIC chip via the edge coupler.

14. The photonic apparatus as in claim 13, wherein the passive alignment structure on the edge coupler comprises at least one of alignment pins, alignment pin holes and surface features to provide a kinematic coupling, a quasi-kinematic coupling or an elastic averaging coupling.

15. The photonic apparatus as in claim 14, wherein the passive alignment structure on the optical fiber connector comprises at least one of alignment pin holes, alignment pins and surface features to provide a kinematic coupling, a quasi-kinematic coupling and an elastic averaging coupling, complementary to the corresponding passive alignment structure of the edge coupler.

16. The photonic apparatus as in claim 1, further comprising a printed circuit board (PCB) supporting the support.

17. The photonic apparatus as in claim 16, wherein the support is one of an interposer and integrated circuit.

18. The photonic apparatus as in claim 1, wherein the first array of mirrors is disposed in optical alignment with the optical elements of the PIC chip by active alignment based on light between the edge coupler and the optical elements of the PIC chip.

19. The photonic apparatus as in claim 1, wherein the first array of mirrors is disposed in optical alignment with the optical elements of the PIC chip by passive alignment of the edge coupler to the edge of the PIC chip.

20. A photonic apparatus, comprising:
a support;
a photonic integrated circuit (PIC) chip attached to a top surface of the support, wherein the PIC chip comprises optical elements routing light to an edge of the PIC chip to provide an optical interface to external of the PIC chip;
an edge coupler comprises a micro-mirror optical bench, which comprises:
a base;
a first array of mirrors defined on the base, wherein each mirror includes a structured reflective surface profile that turns light between a first light path along a first direction in a plane substantially parallel to the top surface and a second light path along a second direction outside the plane; and
a passive alignment structure on the base for demountable coupling to an optical fiber connector of an external optical fiber array,
wherein the edge coupler is supported on the support in alignment with respect to the PIC chip with the first array of mirrors in optical alignment with the optical elements of the PIC chip, and wherein the first light path is between a mirror in the first array of mirrors and a corresponding optical element in the PIC chip,
wherein the first array of mirrors is disposed in optical alignment with the optical elements of the PIC chip by passive alignment of the edge coupler to the edge of the PIC chip,
wherein the edge coupler further comprises a glass cover over the first array of mirrors, wherein fiducials are provided on the glass cover and a top surface near the edge of the PIC chip, and wherein the edge coupler is passively aligned to the PIC chip by optically aligning the fiducials.

* * * * *